United States Patent [19]
Chandonnet et al.

[11] Patent Number: 5,729,641
[45] Date of Patent: Mar. 17, 1998

[54] OPTICAL DEVICE EMPLOYING EDGE-COUPLED WAVEGUIDE GEOMETRY

[75] Inventors: Alain Chandonnet, Cap-Rouge; Andre Fougeres; Gilles Larose, both of Québec City; Yves Painchaud, Sainte-Marie, all of Canada

[73] Assignee: SDL, Inc., San Jose, Calif.

[21] Appl. No.: 657,705

[22] Filed: May 30, 1996

[51] Int. Cl.⁶ .................................................... G02F 1/035
[52] U.S. Cl. .................... 385/2; 385/8; 385/1; 385/14
[58] Field of Search ............................. 385/2, 1–9, 14

[56] References Cited

U.S. PATENT DOCUMENTS

| | | | |
|---|---|---|---|
| 4,786,132 | 11/1988 | Gordon | 250/96.19 |
| 4,807,982 | 2/1989 | Jaeger et al. | 350/96.14 |
| 4,925,269 | 5/1990 | Scrivener | 350/96.33 |
| 4,948,225 | 8/1990 | Rider et al. | 350/96.34 |
| 4,971,426 | 11/1990 | Schildkraut et al. | 350/385 |
| 5,007,695 | 4/1991 | Chang | 350/96.14 |
| 5,060,307 | 10/1991 | El-Sherif | 359/173 |
| 5,067,788 | 11/1991 | Jannson et al. | 385/2 |
| 5,133,037 | 7/1992 | Yoon et al. | 385/132 |
| 5,185,823 | 2/1993 | Kaku et al. | 385/2 |
| 5,359,678 | 10/1994 | Heismann et al. | 385/1 |
| 5,444,723 | 8/1995 | Chandonnet et al. | 372/14 |

OTHER PUBLICATIONS

R. A. Bergh et al. entitled, "Single Mode Fibre Optic Directional Coupler", Electronic Letters, vol. 16(7), pp. 260–261, *Mar.* 27, 1980.

C. D. Hussey et al. entitled "Optical Fibre Polishing With a Motor Driven Polishing Wheel", Electronics Letters, vol. 24(13), pp. 805–807, *Jun.* 23, 1988.

C.Y. Cryan et al., entitled "Overcoming the Effects of Polishing Induced Stress When Fabricating Fused Polished Couplers", Electronics Letters, vol. 29(14), pp. 1243–1244, *Jul.* 8, 1993.

R. Ulrich entitled, "Theory of the Prism–Film Coupler by Plane–Wave Analysis", Journal of the Optical Society of America, vol. 60(10), pp. 1337–1350, *Oct.*, 1970.

A. Chandonnet et al. entitled, "All Fibre Intensity Modulator for Q–Switching", SPIE Proceedings, Section of Mode–Locked and Solid State Lasers, Amplifiers, and Applications, vol. 2041, 282–290, Aug. 17–19, 1993, Québec, Canada.

J. c. Quail et al. entitled, "Long Range Surface Plasmon Modes in Silver and Aluminum Films", Optics Letters, vol. 8(7), pp. 377–379, Jul., 1983.

J. S. Schildkraut entitled, "Long–Range Surface Plasmon Electrooptic Modulator", Applied Optics, vol. 27(21), pp. 4587–4590, Nov. 1, 1980.

W. Johnstone et al. entitled, "Surface Plasmon Polaritons in Thin Metal Films and Their Role in Fiber Optic Polarizing Devices", Journal of Lightwave Technology, vol. 8(4), pp. 538–544, Apr., 1990.

(List continued on next page.)

*Primary Examiner*—Phan T. H. Palmer
*Attorney, Agent, or Firm*—W. Douglas Carothers, Jr.

[57] ABSTRACT

An optical device for modulating or interacting with radiation guided and propagating along an optical longitudinal axis of an optical waveguide, such as, an optical fiber, has a different directional geometry compared to conventionally comparable devices such as, for example, plasmon or planar surface modulators for optical fibers. The geometry includes a nonlinear, electro-optic medium formed between two spatially disposed electrodes. The medium/electrode sandwich is aligned along the waveguide longitudinal propagating axis and extends in a radial direction from the optical waveguide core with the inner end of the medium in spatial proximity to the waveguide core for evanescent coupling with the radiation field propagating in the waveguide. An applied electric field to the spatially disposed electrodes varies the refractive index of the electro-optic medium from just below the effective refractive index of the waveguide to just above the effective refractive index waveguide to induce a lossy condition on the propagating radiation. Modulation of the applied electric field will bring about intensity modulation of the propagating radiation.

53 Claims, 7 Drawing Sheets

OTHER PUBLICATIONS

M. N. Zervas entitled, "Surface Plasmon Polariton Fiber Optic Polarizers Using Thin Nickel Films", IEEE Photonics Technology Letters, vol. 2(4), pp. 253–256, Apr., 1990.

K. Thyagarajan et al. entitled, "Thin Metal Clad Waveguide Polarizers: Analysis and Comparison With Experiment", Optics Letters, vol. 15(18), pp. 1041–1043, Sep. 15, 1990.

S. Pilevar et al. entitled, "Analysis of Dual Metal Coated In-Line Fiber Optic Polarizer", Journal of Optical Communication, vol. 12, pp. 22–25, (191) no month.

K. Welford entitled "Tutorial Review— Surface Plasmon–Polaritons and their Uses", Optical and Quantum Electronics, vol. 23, pp. 1–27, (1991) no month.

D. A. Ender et al. entitled "Polymeric and Organic Crystalline Films for Electro–Optic Applications", SPIE Proceedings of Nonlinear Optical Porperties of Organic Materials, vol. 971, pp. 144–153, (1988); no month.

R. Lytel et al. entitled, "Organic Electro–Optic Waveguide Modulators and Switches", SPIE Proceedings of Nonlinear Optical Properties of Organic Maaterials, vol. 971, pp. 218–229, (1988); no month.

G. T. Boyd entitled, "Appications Requirements for Nonlinear Optical Devices and the Status of Organic Materials", Optical Society of America B, vol. 6(4), pp. 685–692, Apr. 1989.

G. H. Cross et al. entitled, "Polymeric Integrated Electro–Optic Modulators", SPIE Proceedings of Integrated Optics and Optoelectronics, vol. 1177, pp. 79–91, (1989) no month.

K. D. Katz et al. entitled, "Second Order Nonlinear Optical Devices in Poled Polymers", SPIE Proceedings of Nonlinear Optical Properties of Organic Materials II, vol. 1147, pp. 233–244, (1989) no month.

W. Johnstone et al. entitled, "Fibre Optic Modulators Using Active Multimode Waveguide Overlays", Electronics Letters, vol. 27(11), pp. 894–896, May 23, 1991.

M. Wilkinson et al. entitled, "Optical Fibre Modulator using Active Electro–Optic Polymer Overlay", Electronics Letters, vol. vol. 27(11), pp. 979–981, May, 1991.

Y. Shuto et al. entitled, "Electrooptic Light Modulation and Second Harmonic Generation in Novel Diazo Dye–Substituted Poled Polymers", IEEE Photonics Technology Letters, vol. 3(11), pp. 1003–1006, Nov. 1991.

G. Fawcett et al. entitled, "In–Line Fibre Optic Intensity Modulator Using Electro Optic Polymer", Electronics Letters, vol. 28(11), pp. 985–986, May 21, 1992.

M. J. F. Digonnet et al., "Measurement of the Core Proximity in Polished Fiber Substrates and Couplers", Optic Letters, vol. 10(9), pp. 463–465, Sep., 1985.

Ajoy K. Ghatak et al. entilted, "Numerical Analysis of Planar Optical Waveguides Using Matrix Approach", Journal of Lightwave Technology, vol. LT–5(5), pp. 660–667, May , 1987.

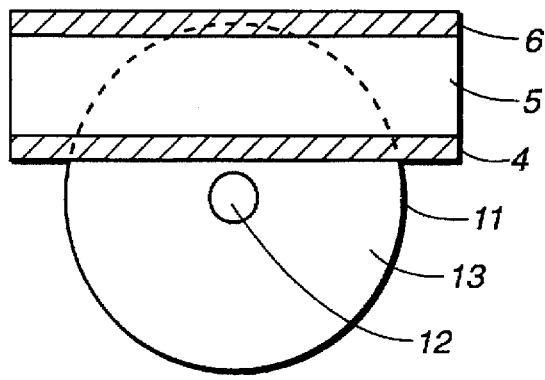
FIG._1
(PRIOR ART)
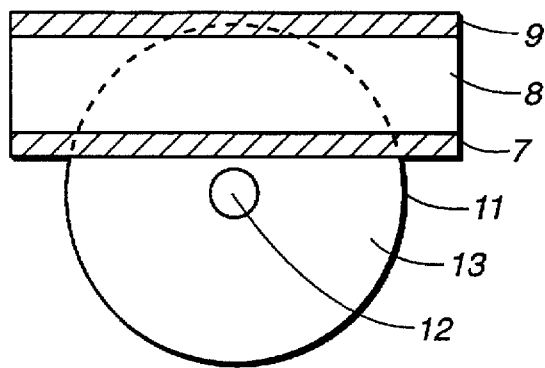
FIG._2
(PRIOR ART)
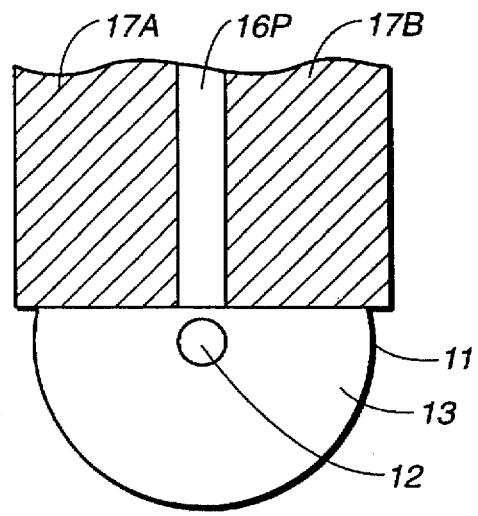
FIG._3

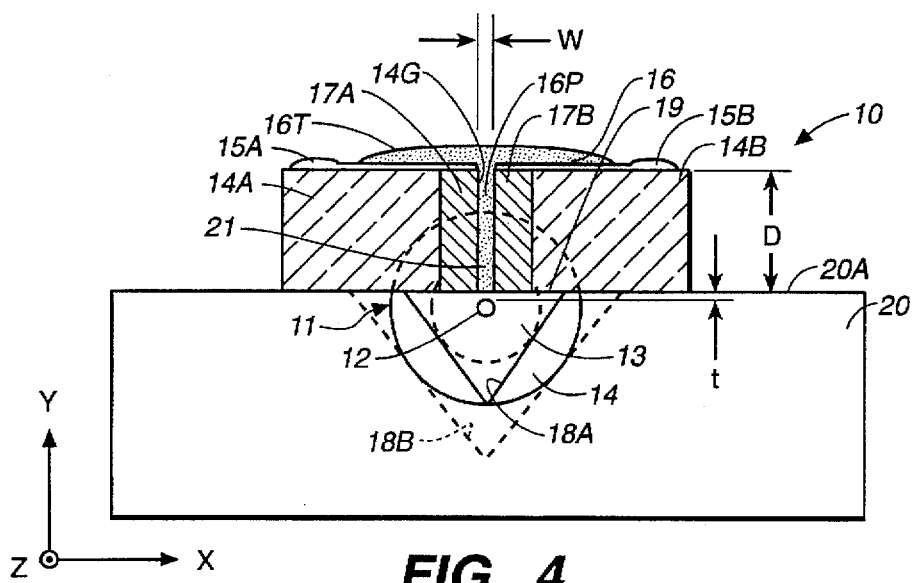
FIG._4
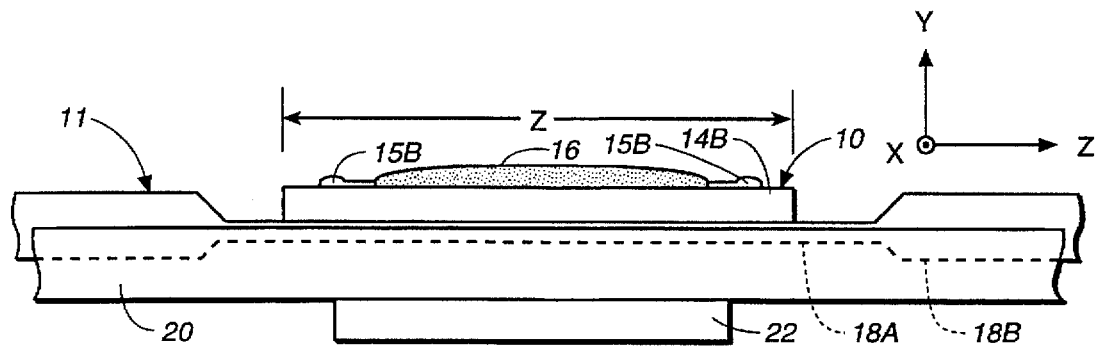
FIG._5
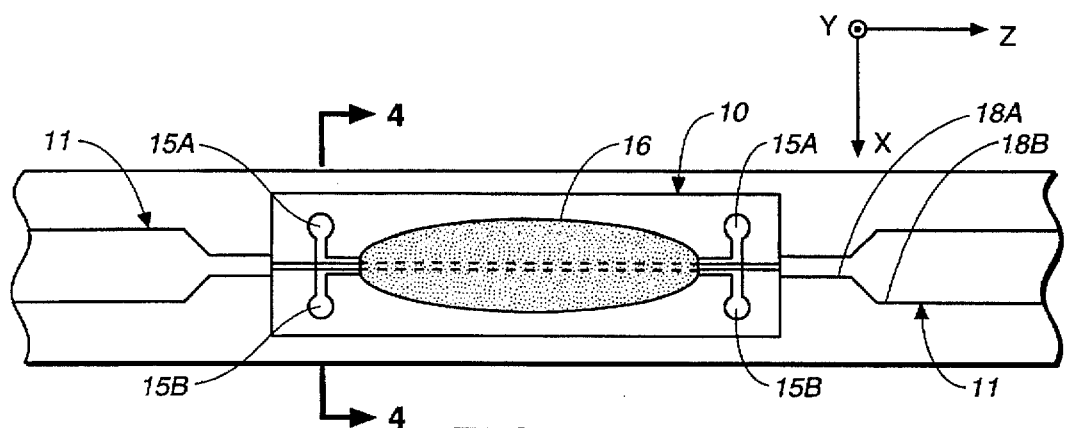
FIG._6

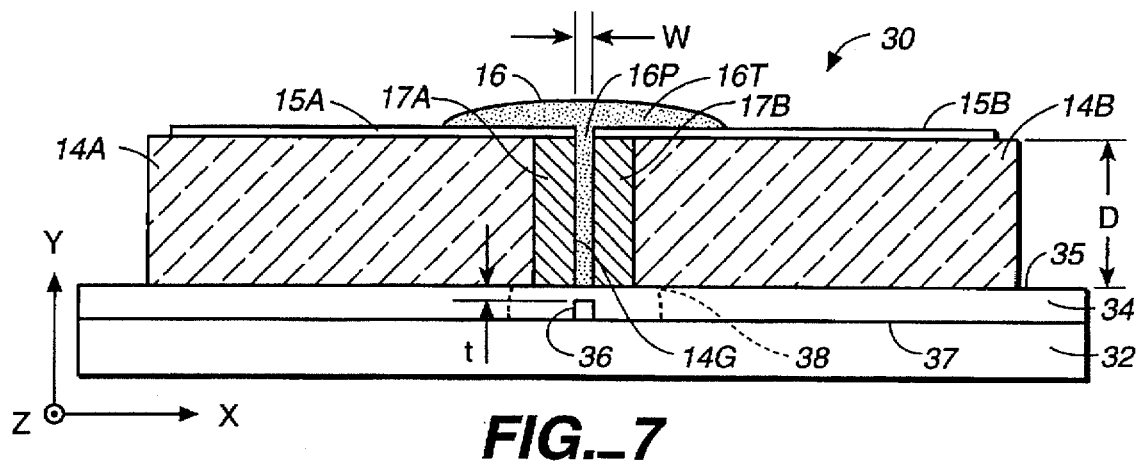
FIG._7
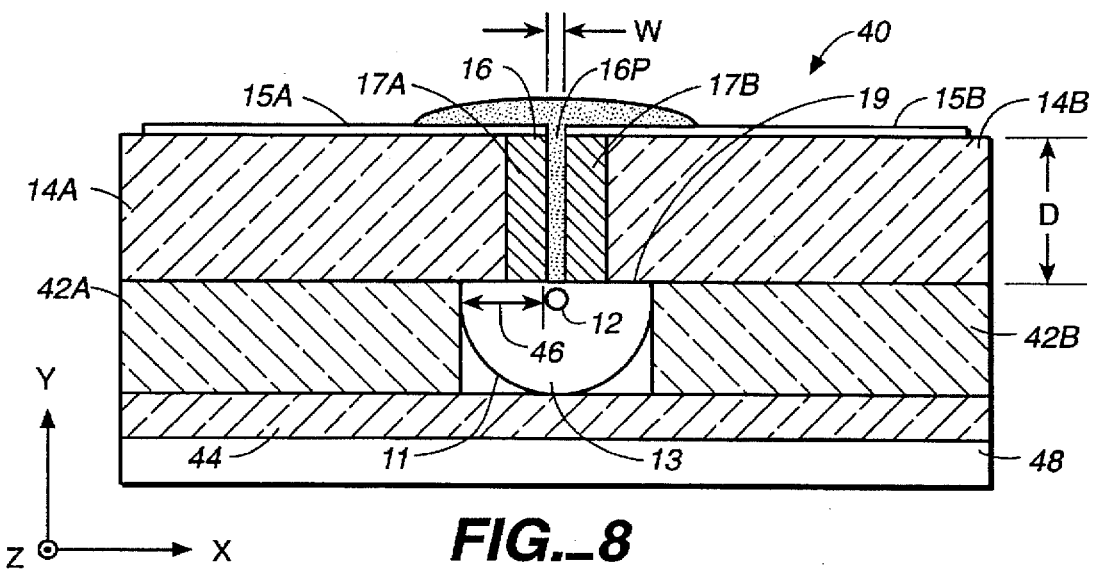
FIG._8

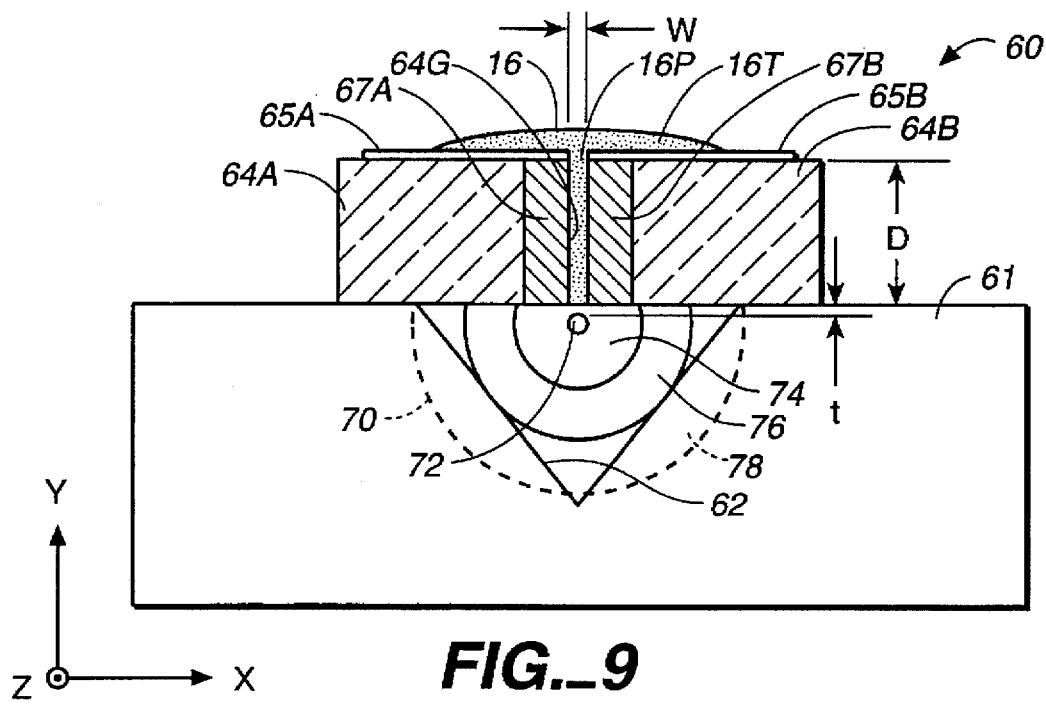
FIG._9
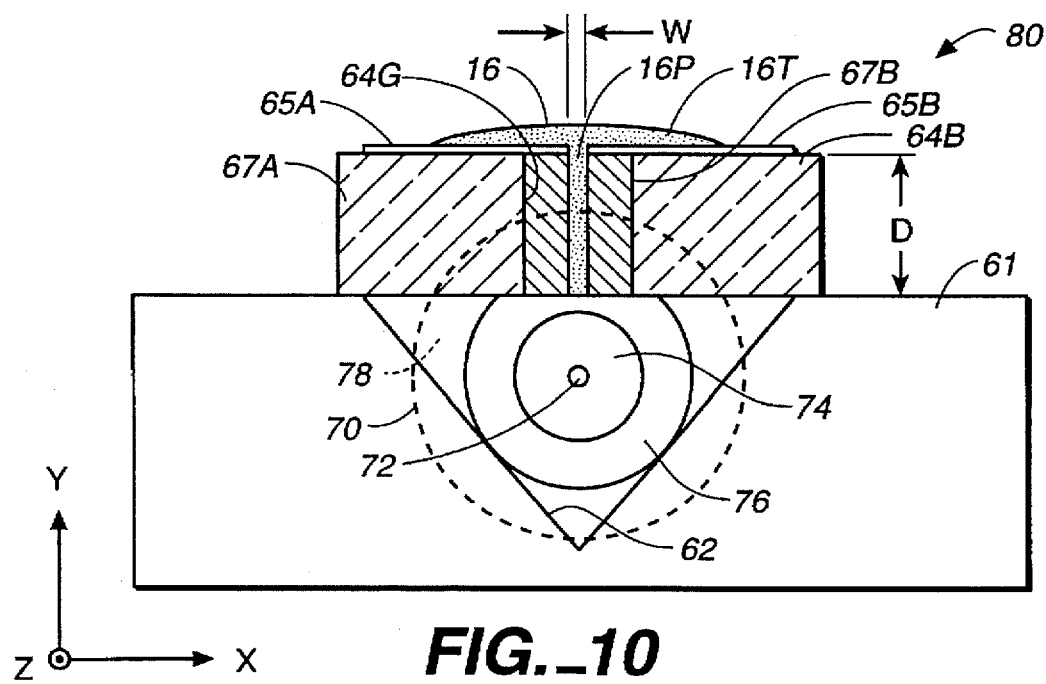
FIG._10

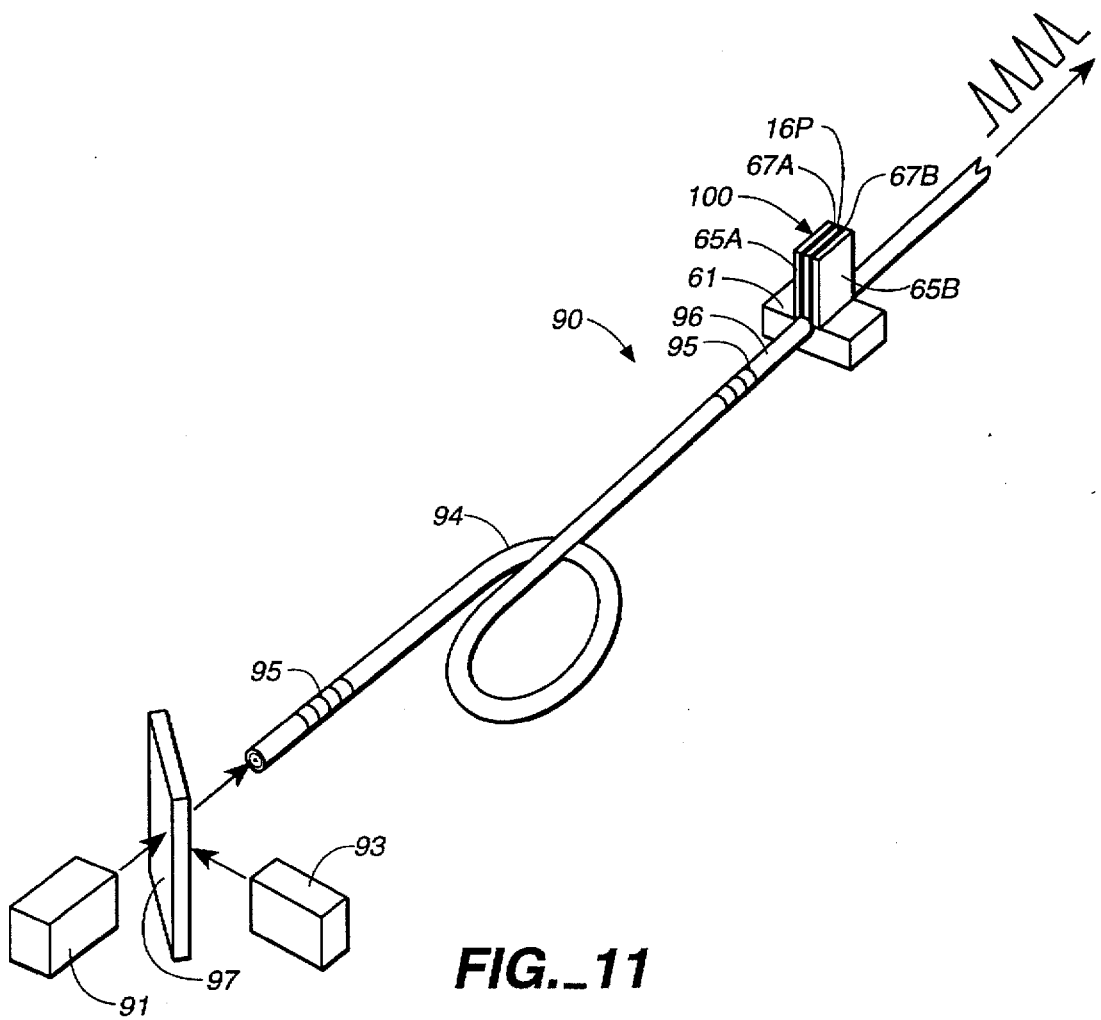
FIG._11

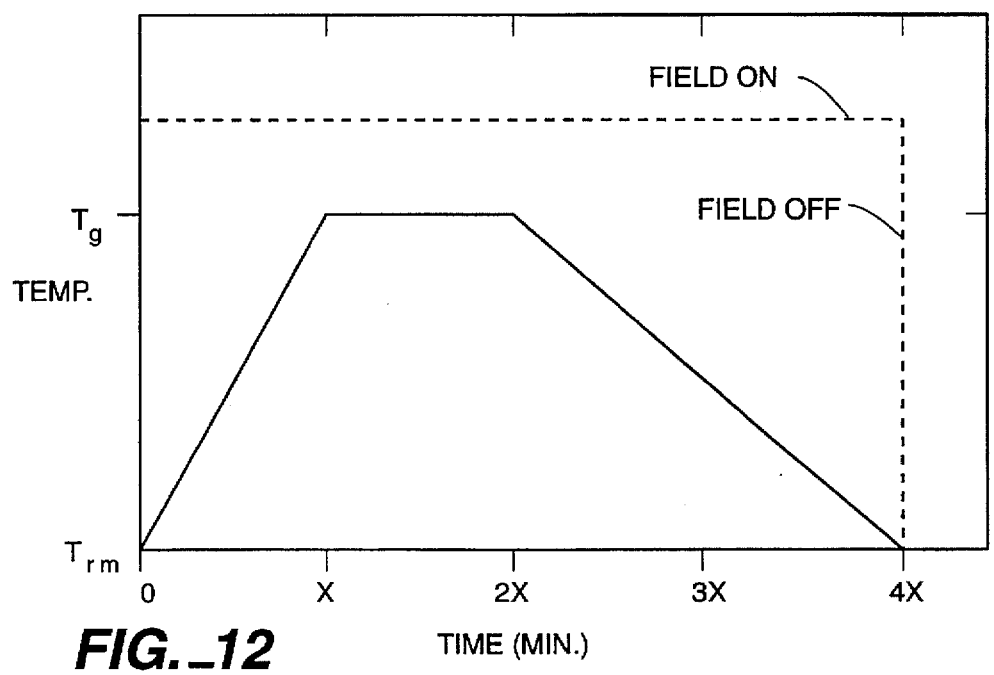
FIG._12
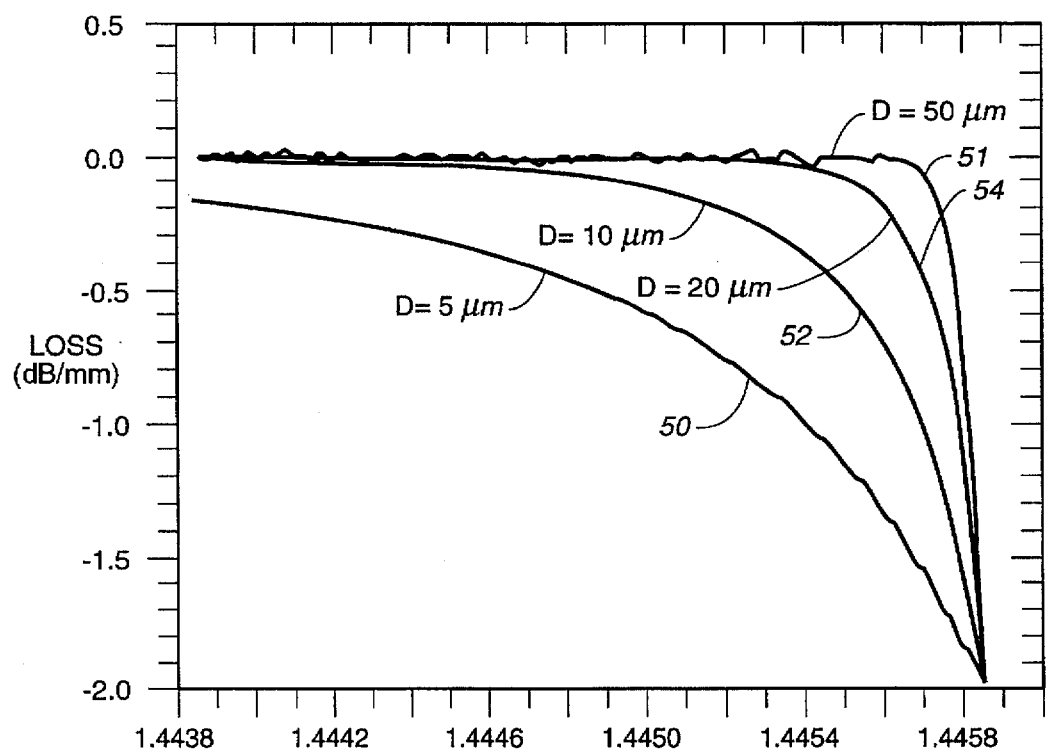
FIG._13

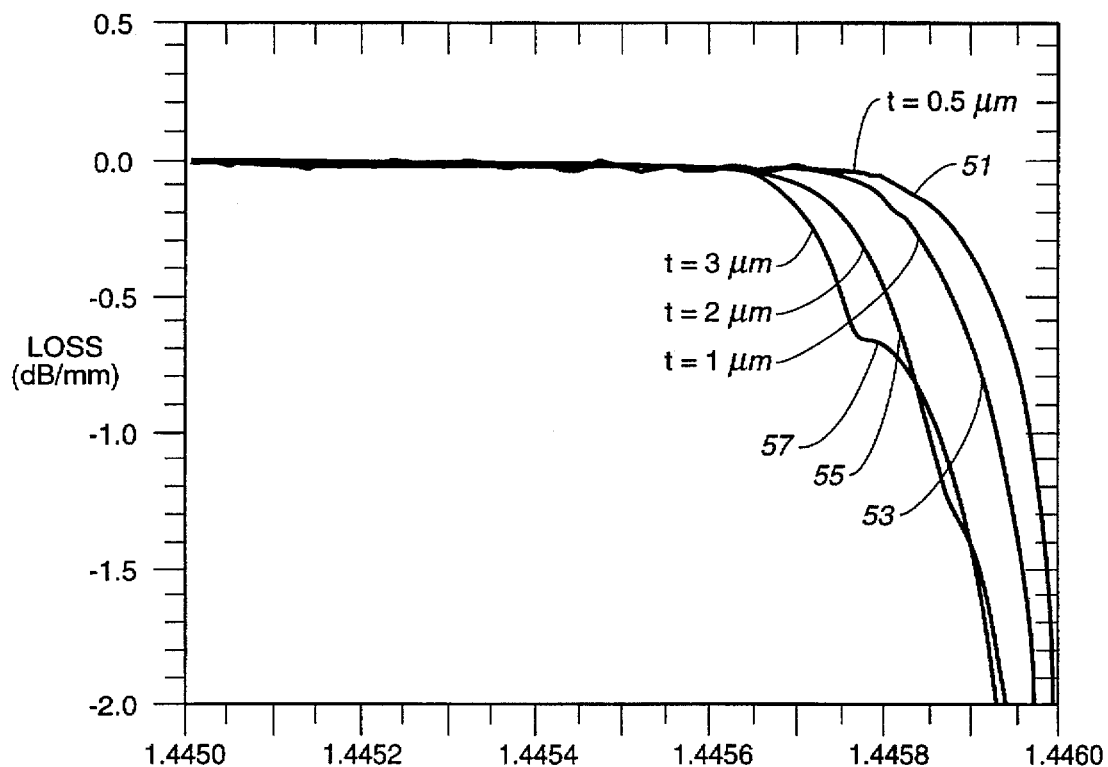
FIG._14
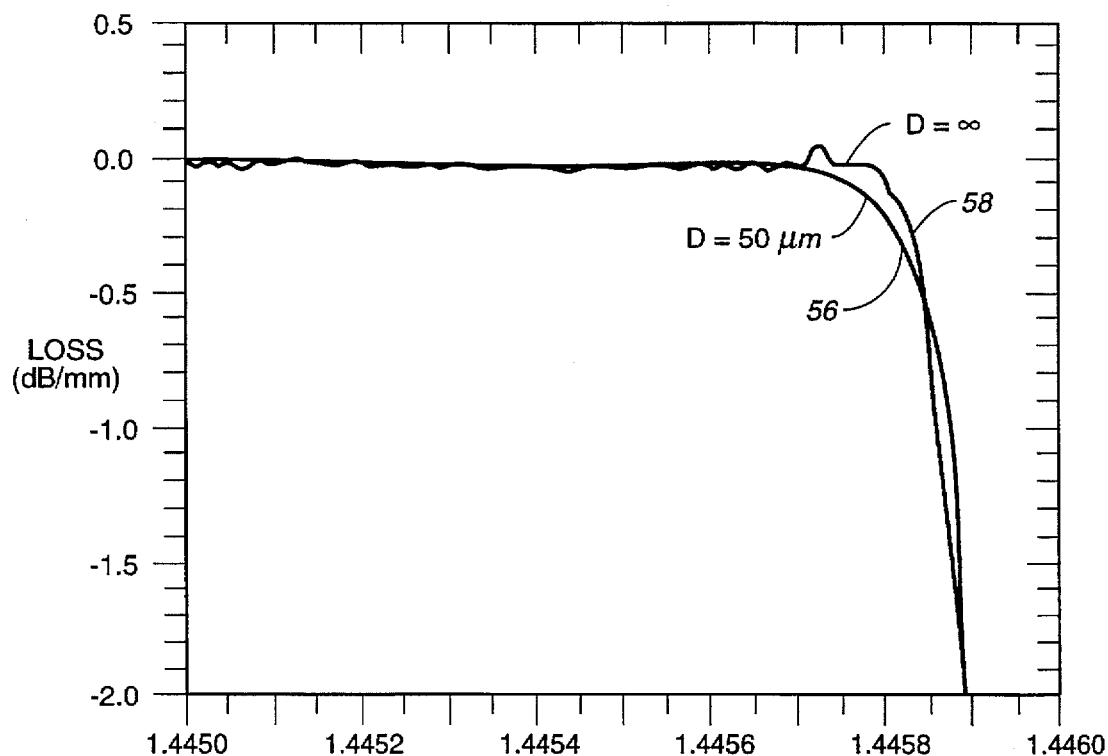
FIG._15

OPTICAL DEVICE EMPLOYING EDGE-COUPLED WAVEGUIDE GEOMETRY

FIELD OF THE INVENTION

The invention relates to the field of optical devices formed in optical waveguides for interacting with propagating light in the waveguide, and more particularly to optical field intensity modulation and optical switching in optical fibers or optical planar waveguides, and more particularly to an optical modulator employing side electrode geometry for modulating electromagnetic radiation propagating in an optical fiber through nonresonant evanescent field interactive coupling using a polymeric material as the active overlay medium.

BACKGROUND OF THE INVENTION

The side-polishing of waveguides, such as optical fibers, to form side-polished couplers to access its radiation propagating field has been discussed in some detail over the past two decades in the optical waveguide art. In the case of optical fibers, a portion of the cladding of the fiber is removed, such as by polishing away upper portion, region or layers of the fiber waveguide, and optical transmission through the fiber is interrupted or otherwise perturbed by placing an optical medium, i.e., an overlay medium, with a higher refractive index than the fiber core on the side-polished portion. Examples are found in the articles of R. A. Bergh et al. entitled, "Single Mode Fibre Optic Directional Coupler",*Electronic Letters*, Vol. 16(7), pp. 260–261, Mar. 27, 1980; C D. Hussey et al. entitled "Optical Fibre Polishing With a Motor Driven Polishing Wheel", *Electronics Letters*, vol. 24(13), pp. 805–807, Jun. 23, 1988; and C. Y. Cryan et al., entitled "Overcoming the Effects of Polishing Induced Stress When Fabricating Fused Polished Couplers", *Electronics Letters*, Vol. 29(14), pp. 1243–1244, Jul. 8, 1993. Such access to the field propagating in the core of a waveguide is accomplished through evanescent field coupling. Changing the strength of this coupling provides a way to modulate the transmission function of a given waveguide. For the device to be useful, abrupt changes in the transmission, T, (or coupling strength, $\Delta k$) must be possible.

One way to provide a fast and efficient change of coupling strength, $\Delta k$, is to place an overlay medium in the side-polished region of the waveguide. Examples of the use overlay mediums are disclosed in the articles of R. Ulrich entitled, "Theory of the Prism-Film Coupler by Plane-Wave Analysis", *Journal of the Optical Society of America*, Vol. 60(10), pp. 1337–1350, October, 1970; and A. Chandonnet et al. entitled, "A Fibre Intensity Modulator for Q-Switching", *SPIE Proceedings, Section of Mode-Locked and Solid State Lasers, Amplifiers, and Applications*, Vol. 2041, 282–290, Aug. 17–19, 1993, Québec, Canada. In general, coupling of radiation between normally guided mode or modes in the waveguide and outside the waveguide is carried out by changing the refractive index of the overlay medium in the side-polished region of the waveguide. Resonant coupling between the field propagating in the waveguide and the overlay medium results in an energy transfer from the waveguide to the overlay medium. When the interaction length, L, and the coupling strength, k, of the fields are carefully adjusted, essentially all the energy from the waveguide can be transferred into the overlay medium. The extent to which this transfer is allowed is a function of the effective propagation constant $n_{eff}$ of the waveguide. Modulating $n_{eff}$ is, therefore, the key to modulate the transmission, T, of a side-polished fiber and is usually accomplished by changing the refractive index of the overlay medium. The way in which the coupling strength, k, is changed for a given variation, $\Delta n$, of the medium is largely dependent on its geometry and its composition. The more sensitive it is to a given $\Delta n$, the faster the resultant modulation. In other words, sharp resonances between the optical mode or modes of the waveguide and the overlay medium are desirable since it translates into a strong coupling variation, $\Delta k$, for a relatively small $\Delta n$.

This is the principle of operation of plasmon polaritons fiber modulators and polarizers. Examples of such devices are disclosed in the articles of J. C. Quail et al. entitled, "Long Range Surface Plasmon Modes in Silver and Aluminum Films", *Optics Letters*, Vol. 8(7), pp. 377–379, July, 1983; J. S. Schildkraut entitled, "Long-Range Surface Plasmon Electrooptic Modulator", *Applied Optics*, Vol. 27(21), pp. 4587–4590, Nov. 1, 1980; W. Johnstone et al. entitled, "Surface Plasmon Polaritons in Thin Metal Films and Their Role in Fiber Optic Polarizing Devices", *Journal of Lightwave Technology*, Vol. 8(4), pp. 538–544, April, 1990; M. N. Zervas entitled, "Surface Plasmon Polariton Fiber Optic Polarizers Using Thin Nickel Films", *IEEE Photonics Technology Letters*, Vol. 2(4), pp. 253–256, April, 1990; K. Thyagarajan et al. entitled, "Thin Metal Clad Waveguide Polarizers: Analysis and Comparison With Experiment", *Optics Letters*, Vol. 15(18), pp. 1041–1043, Sep. 15, 1990; S. Pilevar et al. entitled, "Analysis of Dual Metal Coated In-Line Fiber Optic Polarizer", *Journal of Optical Communications*, Vol. 12, pp. 22–25, (1991); and K. Welford entitled "Surface Plasmon Polaritons and their Uses, Tutorial Review", Section on "Properties of Surface Plasmon Polaritons", *Journal of Optical and Quantum Electronics*, Vol. 23, pp. 427, (1991). In these devices, a thin layer or layers of metal are sandwiched between the side-polished fiber and an active overlay medium. Changing the refractive index of the electro-optic overlay medium by applying an electric field through the medium strongly modifies the long range plasmon resonances of the thin metallic layer. Because the phase matching condition between the guided mode of the fiber and the plasmon is very stringent, very sharp transitions can, in principle, be achieved.

Another type of modulator relies on an overlay medium of polymeric composition which is itself a thin planar electro-optically active waveguide sandwiched between transparent electrodes, such as ITO. Examples of such modulators are disclosed in the articles of D. A. Ender et al. entitled "Polymeric and Organic Crystalline Films for Electro-Optic Applications", *SPIE Proceedings of Nonlinear Optical Properties of Organic Materials*, Vol. 971, pp. 144–153, (1988); R. Lytel et al. entitled, "Organic Electro-Optic Waveguide Modulators and Switches", *SPIE Proceedings of Nonlinear Optical Properties of Organic Materials*, Vol. 971, pp. 218–229, (1988); G. T. Boyd entitled, "Applications Requirements for Nonlinear Optical Devices and the Status of Organic Materials", *Optical Society of America B*, Vol. 6(4), pp. 685–692, April, 1989; G. H. Cross et al. entitled, "Polymeric Integrated Electro-Optic Modulators", *SPIE Proceedings of Integrated Optics and Optoelectronics*, Vol. 1177, pp. 79–91, (1989); K. D. Katz et al. entitled, "Second Order Nonlinear Optical Devices in Poled Polymers", *SPIE Proceedings of Nonlinear Optical Properties of Organic Materials II*, Vol. 1147, pp. 233–244, (1989); W. Johnstone et al. entitled, "Fibre Optic Modulators Using Active Multimode Waveguide Overlays", *Electronics Letters*, Vol. 27(11), pp. 894–896, May 23, 1991; M. Wilkinson et al. entitled, "Optical Fibre Modulator using Active Electro- Optic Polymer Overlay", *Electronics Letters*, Vol. Vol. 27(11), pp. 979–981, May, 1991; Y. Shuto et al. entitled, "Electrooptic Light Modulation and Second Harmonic Generation in Novel Diazo Dye-Substituted Poled Polymers", *IEEE Photonics Technology Letters*, Vol. 3(11), pp. 1003–1006, November, 1991; and G. Fawcett et al. entitled, "In-Line Fibre Optic Intensity Modulator Using Electro Optic Polymer", *Electronics Letters*, Vol. 28(11), pp. 985–986, May 21, 1992. Since this polymeric material is electro-optically active, applying an electric field through the material changes its effective propagation constants.

Several patents also exemplify these modulator devices which are U.S. Pat. No. 4,807,982 to Jaeger et al.; U.S. Pat. No. 4,925,269 to Scrivener; U.S. Pat. No. 4,948,225 to Rider et al.; U.S. Pat. No. 4,971,426 to Schhildkraut et al.; U.S. Pat. No. 5,007,695 to Chang; U.S. Pat. No. 5,060,307 to El-Sherif; U.S. Pat. No. 5,067,788 to Jannson et al.; U.S. Pat. No. 5,133,037 to Yoon et al.; and U.S. Pat. No. 5,444,723 to Chandonnet et al. All these modulator devices can be characterized by the resonant nature of the coupling between the fields in both the fiber and the overlay medium, i.e., energy transfer from one optical medium to the other is allowed between guided modes of each medium.

In all the above approaches, the overlay medium can be of any class of electro-optically active material, i.e., a material having an index of refraction that is changed or varied by an applied electric field through the material. One such class of particularly promising material is poled polymers. These dye-doped polymers are organic compounds into which chromophores are included either by direct incorporation in solution or by backbone grafting or cross-linkage of the dye molecules into the polymer chains. Poling this material is done by heating the polymer close to its glass transition temperature, $T_g$, while applying and maintaining a strong electric field across the material while the temperature of the material is returned to room temperature. This poling procedure serves the purpose of macroscopically orienting the dye molecules in a preferential direction to lock them permanently in that state so that the material becomes non-centrosymmetric and exhibits a large permanent second order susceptibility $X^{(2)}$. These materials have very important properties, for example, a small dielectric constant (important for high speed operation), large nonlinearities (important for low-voltage operation), ease of processability and a relatively low-cost as compared to other non-centrosymmetric inorganic nonlinear crystals, such as $LiNbO_3$ and $LiTaO_3$. Their properties and fabrication process have been the object of an extensive number of books and papers in the literature some of which are fairly recent, for example, the books of P. N. Prasad et al. entitled, "Introduction to Nonlinear Optical Effects in Molecules and Polymers", John Wiley & Sons, New York, 307 pages (1991); H. Kuhn et al. entitled, Nonlinear Optical Materials, CRC Press, Boca Raton, Fla., 335 pages (1992); and G. Mohlmann (Ed.) entitled, "Nonlinear Optical properties of Organic Materials VII, SPIE, The International Society for Optical Engineering, Bellingham, Wash., 428 pages (1994). Dye-doped polymer with nonlinearities as large as 100 pm/V and thermal stability at temperatures as high as 300° C. have been envisioned recently as disclosed in the book entitled, "Organic Thin Films for Photonics Applications", Vol. 21, 1995 OSA Technical Digest Series (Optical Society of America, Washington, D.C., 1995), 480 pages.

It is accordingly an object of the present invention to provide an improved optical waveguide device functioning as a modulator or switching device for interacting with propagating light in an optical waveguide employing novel geometry.

It is another object of this invention to provide a waveguide intensity modulator or optical switch having an electro-optic polymer medium with edge-coupled or side electrode geometry.

SUMMARY OF THE INVENTION

According to this invention, an optical device for modulating, switching or otherwise interacting with radiation guided and propagating along an optical longitudinal axis of an optical waveguide, such as an optical fiber or an optical planar waveguide, is based on a novel nonresonant geometry, which may be referred to as an edge-coupled waveguide geometry, and is capable of high speed switching with large on-off contrast ratios, small insertion losses, low operation voltage, high damage threshold and is suitable for low-cost large volume manufacturing. The edge-coupled geometry allows a relatively smaller electrical field to be applied across a relatively thin layer of polymer (compared to its optical coupling depth) to achieve index modulation of the polymer as compared to a conventional stacked-layer modulator which has a much thicker polymer layer requiring a stronger applied electrical field to index modulate the layer.

The edge-coupled geometry comprises an electro-optic polymer medium sandwiched between a pair of substantially parallel conductive electrodes. The gap, W, formed between the electrodes is small within which the polymer medium is provided. The sandwich is arranged to have one of its orthogonal planar extent extend transversely, e.g., radially, from the radiation axis of propagation of the waveguide medium and the other orthogonal planar extent extend parallel with the radiation axis (z axis) of propagation of the waveguide medium. The reason for calling this geometry, "edge-coupled" geometry is, therefore, because the spatially disposed electrodes for applying an electric field through the electro-optic medium are placed side by side in the longitudinal direction of propagation along the z axis of the waveguide. The modulator waveguide medium is considered "semi-infinite" since the edge-coupled geometry must have a depth, D, that is considerably larger than its width, W, i.e., D >>W, W being of very small value. The electro-optic polymer medium can be considered as semi-infinite in the direction perpendicular to the waveguide propagation axis z so that no resonance occurs between the waveguide mode and the electro-optic polymer medium. Optical coupling from one medium to the other is the result of a change in the refractive index, $\Delta n$, of the electro-optic polymer medium that destroys the total internal reflection condition of the waveguide mode at the modulator/waveguide formed interface. The $\Delta n$ of the electro-optic overlay medium is accomplished through the application of an electric field applied to the spatially disposed electrodes. The energy propagating in the waveguide can, therefore, can be selectively coupled to radiative modes of the electro-optic polymer medium and this energy is selectively allowed to escape into the electro-optic polymer medium by modulation of the edge-coupled modulator.

Because of this particular edge-coupled geometry, the use of a polymer as the electro-optic medium is particularly useful in filling such a narrow gap of width, W. The electrodes may be assembled on top of the prepared waveguide and the gap formed between the electrodes is carefully adjusted. The gap is very narrow so that filling with a chip of electro-optic material would be impossible. However, capillary forces act on the liquid polymer or polymer solution to completely fill the gap. Thus, the employment of an additional step to fill this narrow gap, such as by spinning or dip coating, is not necessary. This is an important eliminated step in fabrication because its avoidance eliminates the delicate procedure of spin coating the modulator device which includes long optical fiber leads on either side of the modulator, i.e., the presence of these leads would make the spinning coating operation very difficult.

The new geometry of this invention can be fabricated as an all-fiber modulator as well as a planar modulator, and is unique from the conventional approaches in that modulator operation does not rely on resonant coupling between guided modes in the optical fiber and the overlay medium. Rather, the onset of modulated switching is created by a change in the refractive index, $\Delta n$, of the electro-optic polymer medium. The switching transition of a particular mode propagating in the optical waveguide is accomplished when the refractive index of the electro-optic polymer medium increases to become larger than the effective index of the particular mode. The energy in the waveguide mode is, consequently, allowed to escape irreversibly by coupling to radiative modes of the edge-coupled modulator structure. This is made possible through the employment of side electrodes extending transversely of the longitudinal axis of the waveguide, instead of the more conventional approach of employing a stacked layer geometry which forbids the employment of a very thick overlay structure which would be non-guiding (semi-infinite regime) but would require a very high applied voltage to operate.

The side electrode geometry of this invention also allows very long interaction length, such as one or more centimeters, which is important in creating large contrast ratios for relatively modest variations in the index of refraction of the electro-optic medium. This feature is also an essential prerequisite for achieving low voltage operation of the modulator.

The unique geometry of this invention lends itself to large volume fabrication processes, such as conventional photolithography techniques employing a photoresist. Both the electrodes and their supporting substrate may be made of materials, such as silicon, which can be easily etched. Etching v-shaped grooves in silicon can be accomplished in a batch mode at a very affordable cost per unit. Electrode deposition on glass or silicon supports can be likewise accomplished in an automated step format. The forming of fiducial marks may be formed on the parts to be assembled, which marks may be etched regions for physical or optical discernability. Optically discernible marks, such as comprising titanium, adhere well to silicon. Waveguide polishing to form an optical interactive region between the waveguide and the modulator can also be achieved very efficiently and rapidly by automatization of the polishing steps. On-line optical signal monitoring of the induced loss of a propagating optical signal in the optical waveguide may be monitored to terminate the polishing procedure at a predetermined point. This "dry" fabrication process is particularly useful in the case of an optical fiber since it maintains the chemical and mechanical integrity of the protecting jacket of the optical fiber on either side of the formed modulator.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 1 is a schematic illustration of a conventional plasmon modulator approach based on coupling to plasmon resonances.

FIG. 2 is a schematic illustration of a conventional waveguide modulator approach based on coupling via refractive index variation.

FIG. 3 is a schematic illustration of the edge-coupled modulator approach of this invention based on coupling via refractive index variation.

FIG. 4 is a cross-sectional view taken along the line 4—4 of FIG. 6 of a first embodiment of the edge-coupled modulator of this invention comprising an all-fiber modulator.

FIG. 5 is a side view of the edge-coupled modulator of the first embodiment of this invention.

FIG. 6 is a plan view of the edge-coupled modulator of a first embodiment of this invention.

FIG. 7 is a cross-sectional view of a second embodiment of the edge-coupled modulator of this invention comprising a planar waveguide.

FIG. 8 is a cross-sectional view of a third embodiment of the edge-coupled modulator of this invention comprising a planar waveguide and a modification of the second embodiment.

FIG. 9 is a cross-sectional view of a fourth embodiment of the edge-coupled modulator of this invention as applied relative to the core of a double clad fiber.

FIG. 10 is a cross-sectional view of the edge-coupled modulator of a fifth embodiment of this invention as applied relative to the inner cladding of a double clad fiber.

FIG. 11 is a perspective view of a sixth embodiment of the edge-coupled modulator of this invention integrated with a double clad amplifier or laser.

FIG. 12 is a graphical illustration of the typical electric field poling process for either corona or electrode field application.

FIG. 13 is a graphical illustration of the induced loss as a function of the refractive index the electro-optic polymer for different edge-coupled interactive depths relative to other parameters.

FIG. 14 is a graphical illustration of the induced loss as a function of the refractive index the electro-optic polymer for different residual cladding thickness relative to other parameters.

FIG. 15 is a graphical illustration of the induced loss as a function of the refractive index the electro-optic polymer for edge-coupled interactive depths of D=b 50µm and D=∞ relative to other parameters.

DESCRIPTION OF THE PREFERRED EMBODIMENTS OF THE INVENTION

As used herein, the term, "waveguide" includes optical fibers, surface waveguides, nonlinear crystal waveguides, planar waveguides and other such optical waveguide devices. Also, the figures employed to describe the several embodiment are not drawn to scale in order to better illustrate and describe detail structure of the invention.

According to the prior art, there are two approaches for forming a waveguide coupler to provide electro-optic modulation of propagating radiation in an optical waveguide. On approach is the plasmon approach shown in FIG. 1 and the other approach is the waveguide approach shown in FIG. 2. In FIG. 1, the plasmon coupler of the Kretschmann type is shown coupled to an optical fiber 11 having a core 12 and cladding 13 wherein a portion of cladding layer 13 has been removed to permit good exposure of the coupler to the evanescent wave portions of radiation propagating in fiber core 12. The plasmon coupler comprises a metal layer or electrode 4, an electro-optic dielectric layer 5 comprised of electro-optic material and another metal layer or electrode 6. Evanescent wave portions, extending outside of core 12 into cladding 13, are coupled with surface plasmon waves generated at the interface of metal layer 4 and electro-optic layer 5 by applying an electric field across electrodes 4 and 6 of sufficient magnitude to cause a change in the refractive index of electro-optic layer 5 bringing about its resonance. The surface plasmon wave is an electromagnetic wave supported at the interface between metal layer 4 and electro-optic layer 5 and the intensity of the radiation propagating in waveguide 11 can be modulated by coupling the propagating wave with the surface plasmon wave via evanescent coupling. In general, the TM mode of the propagating radiation will be absorbed by the surface plasmon wave at the resonant frequency of electro-optic layer 5. The plasmon coupler is extremely sensitive to changes in the refractive index of electro-optic layer 5 caused by the applied field so that the refractive index of layer 5 must precise and very close to the effective refractive index of waveguide 11.

In FIG. 2, the waveguide coupler comprises an electro-optic dielectric layer 8, e.g., a nonlinear polymer having electro-optic properties, sandwiched between two metal or conductive layers 7 and 9, with conductive layer 7 being transparent, e.g., ITO, at the wavelength of radiation propagating in waveguide 11. The amount of optical coupling between waveguide 11 and the coupler can be changed by varying the refractive index of polymer layer 8. The geometry of this coupler is similar to that of the plasmon geometry of FIG. 1 except that the refractive index of polymer layer 8 may have an arbitrary value as long as the effective refractive index waveguide 8 can be changed through electro-optic modulation to match the effective refractive index of waveguide 11.

For comparison purposes with FIGS. 1 and 2, the general geometry of the coupler of this invention is shown in FIG. 3. The planar extent of the coupler is positioned to be transverse to the longitudinal optical axis of waveguide 11, in particular, radially disposed of or substantially perpendicular to the waveguide optical axis, whereas, in the case of FIGS. 1 and 2, the planar extent of the coupler is parallel with longitudinal optical axis of waveguide 11. The coupler comprises an electro-optic dielectric layer, preferably comprising a nonlinear polymer medium 16P, sandwiched between two electrodes 17A, 17B. The polymer medium 16P is positioned radially along the optical axis of core 12 so that evanescent wave portions extending outside of core 12 into cladding 13 are longitudinally coupled into medium 16P. Because of this kind of longitudinal coupling into nonlinear medium 16P, we refer to this coupler as an "edge-coupled" modulator.

As in the case of the plasmon coupler of FIG. 1, polymer medium 16P must have a refractive index in close proximity to the effective refractive index of waveguide 11. In particular, the polymer refractive index has a value just below the effective refractive index of waveguide 11 when no electric field is applied across electrodes 17A, 17B so that no significant losses are introduced by its presence. The polymer refractive index must be increased to a value higher than the effective refractive index of waveguide 11 when an electric field is applied across electrodes 17A, 17B so that radiative guiding conditions are lost in waveguide 11 and significant losses are introduced by the higher refractive index of the edge-coupled coupler. In a typical telecommunication optical fiber, the core and cladding indices at 1.53 μm are respectively 1.448 and 1.444. The effective index of the fiber is somewhere between these two values, such as, at about 1.445. Therefore, the refractive index of polymer 16P, after poling, should be very close to this value such as within about $10^{-4}$, e.g., 1.4458. If the electro-optic effect allows a variation in $\Delta n$ of the polymer index of $+1\times10^{-3}$, polymer 16P must have a refractive index of 1.445 for the TM mode when no voltage is applied to electrodes 17A, 17B. The resulting transition sharpness of this geometry design over the designs of FIGS. 1 and 2 will be much sharper and the insertion losses, i.e., losses in the ON state, will be comparatively lower, for example, less than 0.1 dB. The dynamic range is estimated at about twice as large compared to the two prior approaches by as much as about 15 dB.

Another advantage of the edge-coupled geometry is that the thickness of electrodes 17A, 17B is not critical in the design, as is true in the case of both approaches of FIGS. 1 and 2. It can be considered as arbitrarily selected and, therefore, dimensionally larger than the electrode thickness in the approaches of FIGS. 1 and 2 which is a critical consideration in those approaches such as within the range, for example of about 5 nm to about 10 nm. However, the geometry of electrodes 17A, 17B must be taken into account in order to allow for a large modulation bandwidth for the modulator and, also, should not be positioned too close to fiber core 12 so as to introduce losses into the propagating fiber field.

Reference is now made to FIGS. 4-6 disclosing three different views of a first embodiment of a edge-coupled modulator 10 comprising this invention which is an all-fiber waveguide version of the invention. Optical fiber 11 having an outer protective coating 14, cladding 13 and core 12 is first positioned in a v-groove 18A formed, e.g. by etching, in holding substrate 20 made of, for example, silicon. Fiber 11 may be a single mode or multimode fiber at the desired wavelength of operation. Fiber 11 can also be a high birefringent single mode fiber. In the particular case here, a single mode fiber is shown. A portion of the protective jacket 14 of fiber 11 is stripped away exposing fiber cladding 13. The jacket striped portion of fiber 11 is positioned in v-groove 18A with either side of the jacket striped portion of the fiber resting in a deeper v-groove 18B. In the case where fiber 11 is of high birefringent type, the birefringent axis of core 12 would normally be oriented, respectively, parallel and perpendicular to polished surface 19. Exposed fiber cladding 13 is then polished flat to a surface region 19 so that a small residual cladding thickness, t, remains over core 13 having a very small value, such as about 1 μm. The preferred range is about 0.5 μm to about 2.0 μm. It should be also noted that polishing can also be accomplished on fiber 11 alone before it is installed on V-grooves 18A and 18B. Polished or removed section 19 of fiber 11 provides access to the optical field propagating within fiber 11.

Polished section 19 of the fiber 11 is substantially flush with the upper surface 20A of substrate 20. Residual cladding thickness, t, should be as small as possible to achieve significant modulation, but must be sufficiently large to provide low loss when modulator device 10 is not in its activated state but not so large as to reduce good optical coupling from fiber core 12 into polymer 16P. Thus, a balance between an acceptable amount of detrimental losses and the desirable coupling strength must be maintained. To achieve a significant amount of coupling, thickness, t, must be comparable or smaller than the propagation wavelength of waveguide 11. As an example, the range for thickness, t, may about 0.25 μm to 5 μm, typically around 1 μm. To achieve the proper thickness, t, in-line optical signal monitoring of the induced loss of a propagating optical signal coupled into the optical waveguide during polishing may be monitored to permit termination of the polishing procedure at a predetermined point through the fiber cladding corresponding to a loss in the amount of light detected from the fiber end which is equivalent to thickness, t.

It should be understood that, while side polishing of fiber 11 to provide optical coupling access to its core can be accomplished, optical fiber having a D-shaped cross-sectional configuration is commercially available with the fiber core in close proximity to the flat surface (equivalent to surface 19 herein) of the D-shaped cross-sectional configuration. Thus, the modulator device 10 of this invention could be fabricated on the D-shaped fiber flat surface eliminating the necessity of polishing a circular shaped cross sectional fiber as shown herein. This D-fiber is currently employed for fabricating fused-fiber optical couplers, the fiber core being sufficiently close to the flat D surface to access the evanescent field of the propagating light. In cases where the core needs to be closer to the flat D surface for better performance as an intensity modulator, the surface could be selectively etched to achieve the desired thickness, t.

FIG. 14 shows the calculated induced loss for different residual cladding thickness relative to the polymer refractive index. The examples shown are for residual cladding thickness, t, of 0.5 µ (curve 51), 1 µm (curve 53), 2 µm (curve 55) and 3 µm (curve 57) where the edge-coupled interactive depth, D, was 50 µm and the refractive indices for the polymer 16P and the covering medium was equal to 1.4460. As can be seen from this data, the effect of increased residual cladding thickness, t, is a shift in the transition point, i.e., the transition becomes less sharper. Also, as indicated above, it determines the coupling strength. Ideally, the value of thickness, t, should be less than 1 µm but if it is too small, as previously indicated, insertion losses will increase.

Polishing may be carried on with the fiber secured in groove 18A of substrate 20 using standard polishing techniques, such as disclosed in the paper of R. A. Bergh et al., supra. Polishing of fiber 11 above can be accomplished with the polishing wheel method of C. D. Hussey et al., supra. Determination as to when the remaining cladding 13 over core 12 of fiber 11 is within an acceptable range can be accomplished using the liquid-drop technique disclosed in the paper to M. J. F. Digonnet et al., "Measurement of the Core Proximity in Polished Fiber Substrates and Couplers", *Optic Letters*, Vol. 10(9), pp. 463–465, September, 1985.

Electrodes 17A and 17B may be deposited metal films or doped silicon films respectively deposited on one side of adjacently disposed dielectric plates 14A and 14B, such as, made from glass or silicon. Conductive films may be suitably deposited by CVD or sputtering process. A metal having low reactivity and diffusivity into polymer 16P is preferred. Examples of such metals are gold, aluminum, silver and nickel. In the case where plates 14A, 14B are silicon, it is possible that the opposing surfaces of these plates forming gap 14G can be doped with a conventional silicon dopant to form conductive surface layers functioning as electrodes 17A, 17B. These plates may be micromachined electrically nonconductive silicon structures with formed conductive side edges of conductive silicon constituting electrodes 17A, 17B. Electrodes 17A and 17B are carefully spaced in opposed relation to form gap 14G of appropriate width, W, and function as electrodes for application of an applied electric field between these electrodes. Gap 14G is either formed with or filled with a nonlinear overlay medium 16P. The spacing of electrode 17A, 17B is critical in that it must be as small as possible in order to have a strong electro-optic effect for a given applied voltage but must be sufficiently large so that the propagating field in fiber core 12 is unaffected by the lateral proximity of metal electrodes 17A, 17B. Also, the uniformity of electrodes 17A, 17B must also be considered, in that, their spatial relation should remain uniform throughout their length, Z, and edge-coupled depth, D, so that, if these electrodes are not predisposed in substantially parallel uniformity, the refractive index change, $\Delta n$, will be different longitudinally along gap 14G and, as a result, the switching transition will not have sharp definition.

As to the amount of electrode spacing for gap 14G, losses of the TE and TM modes is lowest if W is larger than about 10 µm or in the range of about 10 µm to 30 µm, preferably about 20 µm to 30 µm (although not critical) to maintain induced losses to the lowest levels. This is particularly true where the mode of interest is the TM mode. If the mode of interest were the TE mode, the gap width, W, may be smaller, such as low as about 4 µm or below.

An advantage of employing the edge-coupled geometry of this invention is the ability to achieve a closer electrode spacing than would be possible with a staked configuration such as shown in FIGS. 1 and 2, toward reducing the required modulation voltage without increasing the device loss, which is typically in the range of about 10 µm to about 20 µm. The edge-coupled depth, D, must be large enough to dissipate the escaping radiation, perhaps 100 µm or more. There are particular constraints on how large depth, D, can be, except perhaps for fabrication constraints. Thus, the width, W, will be much less than the edge-coupled depth, D, such as a depth to width ratio between 5:1 and 200:1. Devices 10 that have been fabricated have had a ratio of about 50:1.

Separate electrical contact leads 15A and 15B, e.g., gold, are deposited on top surfaces of respective plates and electrodes 14A, 17A and 14B, 17B for the purpose of applying an electrical field between the electrodes. Electrodes 17A, 17B may also be of an optically transparent conductive material, such as ITO, as long as the material is of a lower refractive index than nonlinear overlay medium 16P and above the refractive index of cladding 13.

In essence, edge-coupled depth, D, may be of an arbitrary value since the loss mechanism of modulator 10 is the coupling of the evanescent field or radiative modes from fiber core 12 into polymer 16P. However, the edge-coupled depth involves the interaction length of the modulator and, therefore, should not be too small since this may result in a smaller dynamic range and larger insertion losses due to leakage into modulator covering medium or superstrate 16T, which is either a deposited layer on top of the modulator structure or is a residual amount of polymer 16. This is particularly important in cases where modulator edge-coupled interactive depth, D, is relatively small. In order to introduce losses in an off-state of modulator 10, the covering medium refractive index must be slightly higher than the effective index of fiber 11. However, if edge-coupled interactive depth, D, is sufficiently large so as to be considered "semi-infinite" ($D=\infty$), e.g. greater than 50 µm, the covering medium refractive index will have only marginal or no effect on the operation of modulator 10 so that the covering medium can be omitted. Also, such larger values of edge-coupled interactive depth, D, provide for a sharper transition. FIG. 13 shows loss as a function of polymer refractive index for edge-coupled depths of 5 µm, (curve 50), 10 µm (curve 52), 20 µm (curve 54), and 50 µm (curve 56). The residual cladding thickness, t, in the cases here was equal to 2 µm and the covering medium and polymer medium (P3FMA polymer) refractive indices were both adjusted to be 1.44584 where losses for all cases is 2 dB/mm. It can be seen from these data that the transition is sharpest at 50 μm so that it is important that the edge-coupled interactive depth, D, is sufficiently large to provide for good transitional switching.

The application of an electrical field at two different points in time to electrodes 17A, 17B serves two different functions: poling and modulating. First, in a DC mode of operation, the applied field is employed to pole the polymer 16P in gap 14G, which poling process will be discussed in further detail later. Secondly, in a AC mode of operation, the applied field provides for high speed modulation, such as modulation bandwidths within tens of GHz, of the effective refractive index of poled polymer 16P from a point just below the effective refractive index of fiber 11, such as within $10^{-4}$, to a point above the effective refractive index of fiber 11. Careful design of the electrode geometry is required to avoid undesirable effects, such as parasitic capacitance that might have a detrimental impact on the operating speed of modulator device 10. Modulation speeds in the GHz regime require a traveling wave approach that takes into account the phase matching condition between the propagating electrical and optical fields. Alignment of and spacing between electrodes 17A and 17B is an important factor since parallelism must be maintained over an interaction length, Z, which may typically be in the range of, but not restricted to, about 1 mm to about 10 mm.

Fiducials in the form of etched reference patterns, or physical or optical alignment patterns in substrate 20 may be provided to aid in this alignment procedure functioning in a manner similar to either placement of jigsaw pieces or spacers which simplify large volume manufacturing of modulator 10.

After positioning and fixing into position of electrodes 17A, 17B, gap 14G is filled with dye-doped polymer 16 having electro-optic properties induced through the presence of NLO active chromophores in the polymer which, when heated and poled, preserve nonlinear optical properties so that the refractive index of the polymer can be subsequently varied through variance of an applied electric field across the poled polymer.

The placement of the polymer within gap 14G may be accomplished by placing a drop or drops of the polymer diluted in an appropriate solvent or of melted polymer at one or both ends of or on the upper edge of the surfaces of electrodes 17A, 17B forming gap 16G. Capillary forces acting on polymer 16 draws the material into gap 14G, progressively filling the gap throughout its volume forming sandwiched layer 16P. The remaining polymer material 16T may remain on the top surface of modulator 10 functioning as a covering medium. As previously indicated, polymer medium 16P has a refractive index adjusted to be just below the effective refractive index of fiber medium 11 when no voltage is applied to electrodes 17A, 17B.

A thermoelectric cooler 22, shown in FIG. 5, is positioned beneath substrate 20, and allows for the fine temperature tuning and stabilization of the instantaneous refractive index of polymer 16 so that tuned modulator 10 may be operated at the edge of its refractive index transition. This is also desirable in order to minimize the amount of the electric field, i.e., applied voltage, required to generate the onset of modulated switching. Thermal tuning is possible because polymers have much larger refractive index coefficient of thermal variation (dn/dT) than in the case of the glass from which fiber 11 is made. Ideally, the polymer characteristics, such as, its index of refraction, index dispersion and dn/dT should closely match those of optical fiber 11 so that thermal tuning may be unnecessary.

The side electrode geometry described above can be employed to produce polymeric intensity edge-coupled modulators in planar type waveguides. FIG. 7 discloses the cross section of a second embodiment which comprises edge-coupled modulator 30 which is a planar or slab waveguide version of the invention. The planar waveguide is formed in a waveguide portion 34 supported on a substrate 32 and has a formed waveguide channel 36, which may formed with lithography patterning via wet or dry etching.

Waveguide channel 36 has the advantage of low-loss connectivity with input and output optical fibers because of the material index and the freedom to design waveguides having physical properties, such as refractive index properties and core dimensions, similar to the fiber to which the modulator is to be fused or otherwise optically coupled.

FIG. 8 discloses the cross section of a third embodiment of this invention which comprises edge-coupled modulator 40 wherein silicon substrate 32 of the previous embodiment is replaced by polished glass slides or plates 42A and 42B or any other suitable dielectric material mounted on substrate 44, such as glass or silicon. In the case here, plates 14A, 14B and 42A and 42B are glass plates functioning together as spacers for the forming gap 14G as well as a spacer relative to the thickness of the side-polished portion 19 of fiber 11. In other words, glass plates 42A, 42B may be surface etched to be the size of the polished fiber 11. If plates 14A, 42A and plates 14B, 42B are preassembled with a predetermined offset 46, their final assembly on substrate 44 without requiring fiducial marks of any kind to provide the proper gap width, W, can be easily accomplished. Thermoelectric cooler 48 is secured into position beneath substrate 44 for fine tuning the index of refraction of nonlinear polymer 16P for adjusting the operating transition point of edge-coupled modulator 40.

Reference is now made to FIGS. 9–11 wherein the edge-coupled modulator of this invention is employed with a multimode fiber, double clad fiber 70. Basically, modulator 60 in FIG. 9 is the same structure as modulator 10 shown in FIG. 4 and comprises substrate 61, which may be of silicon, having an etched v-groove 62 in its upper surface. Double clad fiber 70 comprises a core 72, inner cladding 74, outer cladding 76 and outer jacket 78. A portion of outer jacket 78 is removed and fiber 70 is positioned in groove 62 with outer cladding 76 engaging the sides of the groove. Fiber 70 is then side-polished to within a residual cladding thickness, t, relative to inner cladding 74. Then, the assembled components of the modulator comprise the dielectric plates 64A, 64B with deposited surface electrodes 67A, 67B forming gap 64G radially centered over core 72 of fiber 70. Electro-optic polymer 16 is formed in gap 64G as polymer medium 16P with a portion 16T extending outside the gap which is optional, particularly if the edge-coupled interactive depth, D, is sufficiently large. A portion of modulator 60 will be within a portion of inner cladding 74 in proximity to core 72 by a thickness, t, so that it will interfere with the pump field propagating in inner cladding 76. Alternatively, the lower and upper portions of electro-optic polymer medium 16P could be of different refractive indices so that the refractive index of the lower portion within inner cladding 74 could closely match with the refractive index of inner cladding 74 whereas the upper portion could have a refractive index closely matching that of core 72. Also, the lower portion may be devoid of electro-optic effects due to lack of an active chromophore so that it is not a dye-grafted copolymer which can be poled. On the other hand, the active chromophore may be made monotonical in the polymer, i.e., starting zero content at the most inner portion of polymer 16P and monotonically increasing in amount to the upper or top surface of polymer 16P. The lower portion of polymer 16P may have a refractive index substantially the same as inner cladding in the case of the FIG. 9 embodiment. Also, in this alternative, a different filling process would be necessary for forming polymer 16P between electrodes. In any of these cases, in the absence of an applied field, the upper portion of polymer 16P, within the evanescent field of the propagating radiation within fiber core 72, would have a refractive index just below that of core 72, and in the presence of an applied field, the upper portion would have a refractive index just above that of core 72.

Modulator 80 in FIG. 10 is identical to modulator 60 in FIG. 9 except for the depth of polishing of fiber 70. In FIG. 10, the polished depth ends in outer cladding layer 76 rather than in inner cladding layer 74. In this manner, polymer medium 16P is optically coupled to the evanescent field from core 72 through inner cladding 74 as well as the pump field in inner cladding 76 for intensity modulation. While significant coupling with optical fields in fiber 70 is diminished due to the additional distance between core 72 and the input of modulator 80, there would be some interaction with modes of the pumping wavelength.

FIG. 11 is an example of the application of the modulators of FIGS. 9 and 10. Shown in FIG. 11 is laser modulator 90 comprising double clad fiber laser 94 and edge-coupled modulator 100 disposed in the same double clad fiber 70, but outside of the boundary of the formed laser structure. Modulator 100 may be either modulator device 60 or 80. Fiber laser 94 may be a rare-earth doped fiber laser or a Raman (Brillouin) laser utilizing Raman (or Brillouin) scattering. In order to form an oscillator cavity, gratings 95 are formed at the laser cavity ends having a period of the desired wavelength which is wavelength matched with modulator 100. Fiber laser 94 has an injection signal source 91 coupled as input to its core 72 via conventional optics, and pump source 93 is coupled as input, via conventional optics and dichroic beam combiner 97, to inner cladding 74 of fiber 70.

While FIG. 11 exemplifies a double clad fiber laser application, it will be realized by those skilled in the art that fiber laser 94 may be a rare-earth doped fiber amplifier with the removal of gratings 95. Moreover, rather than a double clad fiber, laser 94 could be single mode, single clad optical laser or amplifier with a rare-earth doped (e.g., Er) or co-doped core (e.g., Er:Yb) and modulator 100 could be of the type shown in any one of FIGS. 4, 7 or 8. Also, edge-coupled modulator section fiber 96 could be a single mode fiber fused or otherwise optically coupled to double clad laser or amplifier 94 and modulator 100 could be of the type shown in any one of FIGS. 4, 7 or 8. Lastly, modulator 100 could be integrated as part of laser or amplifier 94, i.e., integrated within the fiber between gratings 95.

As previously mentioned, the modulator of this invention provides a new geometry for the fabrication of edge-coupled modulators 10, 30, 40, 60 and 80. The design of these modulators are distinguished from conventional plasmon modulators in that their operation does not rely on resonant coupling between guided modes of the optical waveguide and the electro-optic medium, but rather on the onset of switching created by a change in the refractive index of electro-optic medium 16P, which may considered as a semi-infinite medium. The switching transition of a particular mode propagating in the waveguide or fiber is reached when the refractive index of electro-optic medium 16P increases to become larger than the effective index of the particular waveguide or fiber mode. The energy in the waveguide mode is consequently allowed to escape irreversibly by coupling into the radiative modes of the overlay medium. This is made possible through the use of a side electrode geometry instead of the more conventional stacked layer geometry which prevents the use of a thick and, thus, non-guiding overlay structure.

It should be noted that the use of the side electrode geometry of this invention is applicable to any optical waveguide structure including, but without limitation, side-polished optical fibers and high-silica or nonlinear crystal planar channel waveguides.

A dye-grafted electro-optic polymer 16 is preferred for electro-optic active material filling the narrow gap 14G formed between electrodes 17A, 17B. Such a polymer may be any poled, thermoplastic polymeric material containing a NLO active chromophores in solution, grafted to the backbone or cross-linked to the polymer host. Any material, however, with a suitable degree of thermal compatibility with glass may be employed. Polymer glasses are amorphous material and centro-symmetric and, therefore, cannot posses second order optical nonlinearity, since second order susceptibility is described by a third rank tensor. Thus, in order to generate a nonlinear response from polymer medium 16P, the center of inversion symmetry must be removed. This is accomplished by doping the polymer matrix with nonlinear optical moieties having large second order hyper-polarization ability or dipole and orienting all of the nonlinear optic molecules in the polymer through an applied electric poling field. By this means, the inversion symmetry is removed and the individual molecular nonlinearities become additive.

The polymer material should have a refractive index that is very close to the refractive index of the radiation propagating core of the optical waveguide. Examples of polymer materials are DR1-acrylate copolymers, such as methymethacrylated-based monomers copolymerized with, for example, DR1 doped methacrylate (DR1-MA) having a refractive index $n=1.51$ at $\lambda=1.53$ μm and DR1 doped methymethacrylate polymer (DR1-PMMA) having a refractive index $n=1.56$ at $\lambda=1.53$ μm. A known method of lowering the refractive index of acrylates is to substitute some hydrogen atoms with fluorine atoms to form fluorinated polymers, in particular, fluoroacrylate-DR1MA copolymers. Examples of fluorinated copolymers are the synthesization of the p(3FMA) and p(6FPA) polymers in a dopant, such as azo dye Disperse Red 1 (DR1) or azo dye Disperse Red 1 methacrylate (DR1MA), which materials are available, for example, from Les Produits Chimiques Omega, Inc. of Québec, Canada. The polymer p(3FMA-DR1MA) was synthesized with an index of refraction $n=1.443$ at $\lambda=1.53$ μm 1.443, which closely matches the refractive index of a polished optical fiber of $n=1.444$ at $\lambda=1.53$ μm. This index of refraction can be adjusted in the synthesization process anywhere between 1.40 and 1.551 by varying the mixing ratio of P(3FMA) to DR1-PMMA, e.g., varying the molar fraction of DR1 to MA from about 0.025 to about 0.065. Also, the synthesis of dye-grafted copolymer p(3FMA-DR1MA) with the use of high fluorine content and different dye concentrations for doping, the refractive index of this copolymer can be tailored anywhere between 1.40 and 1.55. By varying the mixing ratio of P(6FPA) to DR1-PMMA for the copolymer p(6FPA-DR1MA), a refractive index as low as 1.36 may be achieved. Poling of copolymer p(3FMA-DR1MA) induces an electro-optic coefficient $r_{33}$ on the order of 5 pm/V which is typical of materials doped with the active chromophore, Disperse Red 1. The long term electro-optic stability of this copolymer can be improved by crosslinking the polymer during the poling procedure. Other dyes also may significantly increase the electro-optic coefficient, for example, up to 26 pm/V using PMMA-NAT.

In the filling process for gap 14G or 64G, the electro-optic copolymer p(3FMA-DR1MA) may be dissolved in a solvent such as cyclohexanone, and applied to one end of the electrodes at room temperature in an atmosphere saturated with the solvent (to prevent hardening). As the viscosity of the polymer-solvent mixture is high, it slowly fills electrode gap 14G. Curing of the polymer may be performed at, for example, a temperature of 150° for about 1.5 hours.

Poling is best performed at a temperature around or above the glass-elastomeric transition temperature, $T_g$, of the polymer in a strong electric field of, for example 100 V/μm applied for several minutes. In its elastomeric state, the dopant molecules are free to rotate within the polymer medium. An applied field, such as typically of the order of 100 V per μm, is applied and maintained during the process while the temperature of the polymer is gradually raised from room temperature to its transition temperature, $T_g$, and then gradually decreased to room temperature. The process is carried out over tens of minutes. This process is illustrated in FIG. 12. After monotonically controlling the heating and cooling during the poling process, illustrated in FIG. 12, the electric field is removed and the dopant molecules are left substantially fixed in an aligned position with respect to the formerly applied poling field within the glassy polymer matrix.

A specific example of application of he poling process of FIG. 12 is in connection with the synthesis of dye-grated copolymer p(3FMA-DR1MA). The transition temperature, $T_g$, may be about 110° C. and time X is equal to 10 minutes. The temperature, $T_{rm}$, is room temperature. As previously indicated, in the case of a cross-linked polymer, poling should be accomplished during polymerization of the monomer material. The poling can be accomplished in situ after the gap filing process has been completed.

The particular type of electric field poling that may be applied may be either corona poling or electrode poling. In corona poling, the polymer is subjected to a corona field, such as developed between a plurality of parallel corona wires and a heated ground electrode upon which the sample is positioned. A metal mesh screen may be employed between the sample and the corona wires to distribute the corona discharge uniformly over the sample surface. An applied voltage to the mesh screen may be varied to control the intensity of the distributed corona field. As an example, samples of prepared PMMA-DR1 films having a thickness of about 8.5 μm were corona poled at different applied voltages and time periods. The poling was carried out at 110° C., which is slightly below the transition temperature, $T_g$, for this polymer material, as well as at 130°, which is slightly above the transition temperature, $T_g$. Poling for 10 minutes was a sufficient period of time for poling. At 110° C. with an applied high voltage of about 10 kV produced a larger electro-optic coefficient, $r_{33}$ than poling at 130° C. As an example, $r_{33}$ coefficients for 130° C. and 110° C. were, respectively, about 3.22 pm/V and 4.04 pm/V. The measured $r_{13}$ coefficients were correspondingly 1.2 pm/V and 1.35 pm/V providing ratio values of $r_{33}/r_{13}$ of 2.67 and 2.96. Higher $r_{33}$ coefficients can be achieved employing other copolymers, as previously indicated. Also, amorphous materials with electro-optic coefficients are under examination at this time with potentially long term, room temperature stability. In this connection, see "Organic Thin Films for Photonics Applications", Vol. 21, *OSA Technical Digest Series* (Optical Society of America, Washington, D.C., 1995), 480 pages wherein dye-doped polymers with nonlinearities as large as 100 pm/V and thermal stability as high as 300° C. are possible so that lower field voltages below 10 V/cm will be available.

One advantage of corona poling over electrode poling is that the charges deposited on the surface of the polymer material are not free to move over the surface so that they cannot accumulate near a surface defect. As a result, dielectric breakdown is less likely to happen during corona poling than with electrode poling.

In the case of electrode poling, an applied field is applied directly to electrodes 17A, 17B. The p(3FMA-DR1MA) samples in this case were set to a temperature of 110° C. and the applied field was kept below 75 V/cm to avoid any possible dielectric breakdown. Electro-optic effects were achieved if the poling field was sufficiently high and the poling period was sufficiently long. As examples, a poling field of 60 V/μm with a poling time of 35 minutes following the procedure of FIG. 12 produced a $r_{33}$ coefficient of about 3.7 pm/V. A poling field of only 35 V/μm with a poling time of 50 minutes produced a $r_{33}$ coefficient of only about 1.3 pm/V. However, a poling field of only 35 V/μm with a longer poling time of 60 minutes produced a $r_{33}$ coefficient of about 4.7 pm/V. A poling field of about 50 V/μm to about 60 V/μm for about 50 minutes following the procedure of FIG. 12 preferably produced a high $r_{33}$ coefficient of about 5.2 pm/V.

It is preferred that cross-linking polymerization of polymer medium 16P be performed simultaneously with the electric field poling in order to improve long term stability and retention of the poling induced electro-optic effect. Also, an annealing process can be applied to the poled film after the poling process, with or without a pressurized environment to further enhance retention of the poling induced electro-optic effect. Annealing is carried out just above room temperature, such as, for example, at 40° to 60° C., either in the presence or absence of applied field. Annealing time may be anywhere, for example, from 30 minutes to 10 hours. If a pressure, e.g., above 100 atmospheres, is used to augment the annealing step, the time period for annealing can be materially reduced.

As long as the side electrode walls of electrodes 17A, 17B maintain a fair degree of parallelism throughout their depth, D, and length, Z, comprising the edge-coupled geometry, the particular shape of these electrodes is not important. The width, W, of the gap should be small to allow for low voltage operation. However, this width dimension is determined by consideration of a compromise between the maximum affordable level of detrimental losses introduced by the proximity of the metal electrodes and the amount of applied voltage (or contrast ratio for a given voltage). A drawback of the side electrode geometry may be that the geometry requires a larger nonlinear polymer gap 14G than employed in the conventional approaches of FIGS. 1 and 2 and, hence, a higher operating voltage for a given interaction length, D, than these other conventional geometries in order to maintain the same level of insertion loss. However, this is compensated for, in part, by employing a longer interaction length, D, in the edge-coupled modulator and, further, through the use of newer types of electro-optic polymers that require lower operating voltages.

It should be understood in connection with the anisotropy of the poling process, the index of refraction change, $\Delta n$, of the polymer layer will not be the same in both directions X and Y but larger in X direction. Therefore, the index change, $\Delta n$, will be governed by the polymer nonlinear coefficient $r_{33}$ in the X direction and the nonlinear coefficient $r_{13}$ in the Y direction. Because $r_{33} \approx 3r_{13}$, the device is inherently more polarization sensitive to the TM mode rather than the TE mode. If the birefringence of the fiber is equal to the birefringence of the induced birefringence of the polymer, then the optical device could be operated a polarization insensitive switch provided that the refractive index amplitude change is sufficient for both TE and TM modes.

Numerical simulations of the side electrode geometry of this invention have been carried out to quantify the performance of the invention employing the matrix method of Ghatak et al. disclosed in the article entitled, "Numerical Analysis of Planar Optical Waveguides using Matrix Approach", *Journal of Lightwave Technology*, Vol. LT-5(5), pp. 660–667, May, 1987. FIG. 15 shows the resulting loss in dB/mm of a typical device plotted against the refractive index of the polymer overlay. In the cases here, the residual cladding thickness, t, was 1 μm and the refractive index of the covering medium and polymer was 1.44589 for the case of edge-coupled depth of 50 μm. Parameters of a standard telecommunication optical fiber were used ($n_{core}$=1.46, $n_{clad}$=1.445, dia.=10 μm). The effect of edge-coupled interactive depth, D, in the case of 50μm is shown in curve 56, and in the case where the edge-coupled interactive depth, D, is, effectively, equal to ∞ (semi-infinite) is shown in curve 58. The residual cladding thickness, t, employed was 1 μm. As can be seen from FIG. 15, the effect of D is to change the sharpness of the refractive index transition. A larger value for D is desirable to minimize the voltage change required to switch the transmission state of the modulator device. It is interesting to note that a small $\Delta n=1\times 10^{-4}$ results in an induced loss of 2 dB/mm. This means that a 1.5 cm-long (in the Z direction) modulator device would be able to switch from its initial insertion loss of approximately 0.3 dB to more than 30 dB. Assuming a width of 8 μm for the edge-coupled gap 14G and a $r_{33}$ of 30 pm/V, which is equivalent to the coefficient of $LiNbO_3$, the switching voltage required for this 30 dB dynamic range will be about 15 V. If larger insertion loss can be tolerated, the switching voltage could be further reduced. Envisioned future nonlinear polymers will further reduce the required switching voltage to values below 5 V.

Although the invention has been described in conjunction with one or more preferred embodiments, it will be apparent to those skilled in the art that other alternatives, variations and modifications will be apparent in light of the foregoing description as being within the spirit and scope of the invention. As an example, device 10 may be employed for phase adjustment, or for phase modulation without any intensity modulation. For example, the evanescent wave from the propagating light in the fiber core will extend into polymer 16P so that any changes in the polymer refractive index through the application of an applied voltage to electrodes 17A, 17B will affect the effective refractive index of the fiber. Thus, the voltage could be modulated or changed to change the phase of the fiber propagating light. A Mach-Zender type modulator could be constructed by splitting an optical signal between two fibers using a fiber coupling with phase adjustment to one of the two split optical signals before their recombination via a second fiber coupler. This would require the phase modulation to be at least 180° to go from ON to OFF states. Alternatively, an optical signal may be phase modulated without intensity modulation which has the advantage, as opposed to an intensity modulator, in that the refractive index of polymer 16P is not required to be closely matched to that of the fiber core; rather, it need only be less than the fiber core refractive index. There would be no dissipation of light from device 10 so that its depth, D, could be much smaller, perhaps as little as 10 μm, and phase modulation would be accomplished by change of the applied voltage to electrodes 17A, 17B. Polymer depth, D, only has to be sufficient for the evanescent field from the fiber to decay, typically a distance of a few microns.

Thus, the invention described herein is intended to embrace all such alternatives, variations and modifications that are within the spirit and scope of the invention.

What is claimed is:

1. An optical device for modulating or interacting with radiation guided and propagating along an optical longitudinal axis of an optical waveguide comprising:

a pair of spatially disposed electrodes positioned adjacent to said waveguide and extending substantially parallel with and outward from said longitudinal axis;

an electro-optic medium between said electrodes having one end thereof in juxtaposed relation with said optical waveguide, said electro-optic medium having a refractive index close to the minimum value required to couple said radiation from said optical waveguide into said electro-optic medium;

said electro-optic medium having a portion thereof exposed to an evanescent field of said propagating radiation; and an electric field applied between said electrodes to vary a refractive index of said electro-optic medium affecting the amount of loss of said propagating radiation via said optical device.

2. The optical device of claim 1 wherein said waveguide is an all fiber waveguide.

3. The optical device of claim 2 wherein said fiber waveguide lies in a V-groove etched on a silicon substrate.

4. The optical device of claim 3 wherein said single mode fiber waveguide is birefringent, the two birefringent axis of said birefringent fiber waveguide being aligned respectively parallel and perpendicular to the plane of said electrodes.

5. The optical device of claim 4 herein the birefringence of said birefringent fiber waveguide is equal to the birefringence of said electro-optic medium.

6. The optical device of claim 3 wherein said substrate includes fiducial marks to allow precise positioning of said electrodes.

7. The optical device of claim 2 wherein said all-fiber waveguide comprises a side-polished optical fiber or a D-shaped optical fiber.

8. The optical device of claim 2 wherein said fiber waveguide is single mode.

9. The optical device of claim 2 wherein each of said electrodes is supported by a dielectric substrate that has a step near and parallel to said electrode surface such that when said steps of said substrates including said electrodes are brought in contact with the sides of said fiber waveguide, then said electrode gap is formed.

10. The optical device of claim 2 wherein said fiber waveguide is multimode.

11. The optical device of claim 1 wherein said electro-optic medium is a mixture of polymers that are poled by heating said optical device and applying a voltage across said electrodes and letting said optical device.

12. The optical device of claim 11 wherein said electro-optic polymers have different refractive indices and are mixed in such proportion as to obtain said refractive index of said electro-optic medium.

13. The optical device of claim 12 wherein at least one of said polymers is fluoridated.

14. The optical device of claim 11 wherein said polymer mixture is fluoridated.

15. The optical device of claim 1 wherein said waveguide is an optical planar waveguide.

16. The optical device of claim 15 wherein said optical planar waveguide comprises high-silica planar channel waveguide.

17. The optical device of claim 1 wherein said electrodes are spaced by approximately the same distance as the width of said optical waveguide, said electrodes having a length between about 1 mm and 10 mm and having a width less than 200 μm.

18. The optical device of claim 1 wherein said electro-optic medium is obtained by dissolving a dye in a polymer matrix that is thereafter poled by heating said optical device, applying a voltage across said electrodes and letting said optical device cool down while maintaining said voltage.

19. The optical device of claim 1 wherein each of said electrodes is supported by a dielectric substrate.

20. The optical device of claim 1 wherein said electrodes comprise a conductive metal or optically transparent material.

21. The optical device of claim 1 wherein said electro-optic medium is a polymer.

22. The optical device of claim 21 wherein said polymer comprises the synthesis of dye-grated copolymer.

23. The optical device of claim 21 wherein said dye-grated copolymer comprises p(3FMA-DR1MA), P(6FPA-DR1MA) or PMMA-NAT.

24. The optical device of claim 21 wherein said polymer is pooled by heating said optical device, applying a voltage across said electrodes and permitting said optical device to cool while maintaining said applied voltage.

25. The optical device of claim 21 wherein monomers of different composition and specific mixing ratio are used to synthesize said polymer with said refractive index of said electro-optic medium.

26. The optical device of claim 25 wherein at least one of said monomers is fluoridated.

27. The optical device of claim 21 wherein said polymer is reticulated and said poling is carried on during polymerization.

28. The optical device of claim 1 further comprising a rare-earth doped laser or amplifier.

29. The optical device of claim 1 further comprising a Raman or Brillouin laser or amplifier.

30. The optical device of claim 1 further comprising a thermoelectric cooler to control and stabilize the temperature of said optical device.

31. The optical device of claim 1 wherein said electrodes are designed to form a traveling electric waveguide parallel to the optical waveguide and terminated in its characteristic impedance.

32. The optical device of claim 1 wherein a dielectric superstrate having a refractive index slightly higher than that of said optical waveguide is deposited on top of said electrodes.

33. The optical device of claim 1 wherein said waveguide comprises:
an optical fiber having a core with a surrounding cladding;
said electrodes having a planar configuration having a first plane extending in the direction of said optical longitudinal axis and a second orthogonal plane extending radially of said core, said electro-optic medium extending radially of said core and having its inner end positioned in close proximity to said core.

34. The optical device of claim 33 wherein said optical fiber is single mode.

35. The optical device of claim 34 wherein said optical fiber is birefringent having two birefringent axis aligned, respectively, parallel and perpendicular to said first and second orthogonal planes.

36. The optical device of claim 34 wherein the birefringence of said birefringent single mode fiber is substantially equal to the birefringence of said electro-optic medium.

37. The optical device of claim 33 wherein said optical fiber is multimode.

38. The optical device of claim 37 wherein said optical fiber is birefringent having two birefringent axis aligned, respectively, parallel and perpendicular to said first and second orthogonal planes.

39. The optical device of claim 38 wherein the birefringence of said birefringent single mode fiber is substantially equal to the birefringence of said electro-optic medium.

40. The optical device of claim 33 wherein said electro-optic medium is a mixture of polymers that are poled by heating said optical device and applying a voltage across said electrodes and letting said optical device cool down while maintaining said voltage.

41. The optical device of claim 40 wherein said electro-optic polymers have different refractive indices and are mixed in such proportion as to obtain said refractive index of said electro-optic medium.

42. The optical device of claim 41 wherein at least one of said polymers is fluoridated.

43. The optical device of claim 33 wherein said electro-optic medium is obtained by dissolving a dye in a polymer matrix that is thereafter poled by heating said optical device and applying a voltage across said electrodes and letting said optical device cool down while maintaining said voltage.

44. The optical device of claim 33 wherein a dielectric superstrate having a refractive index slightly higher than that of said optical waveguide is deposited on top of said electrodes.

45. A method of poling an electro-optic medium sandwiched between two electrodes in an optical device comprising the steps of:
spatially maintaining a pair of electrodes in substantial parallel alignment defining a gap therebetween;
forming a solution of the electro-optic medium;
pouring the electro-optic medium into the formed gap;
heating the optical device;
applying a voltage across the electrodes; and
maintaining the applied voltage while permitting the optical device to cool through withdraw of the applied heat.

46. The method of claim 45 comprising the step of mounting the optical device on a birefringent single mode fiber.

47. The method of claim 46 wherein birefringence of said birefringent single mode fiber is substantially equal to birefringence of said electro-optic medium.

48. The method of claim 47 wherein the electro-optic medium is a polymer.

49. The method of claim 45 wherein the electro-optic medium is a polymer.

50. The method of claim 45 wherein the electro-optic medium is a mixture of polymers.

51. The method of claim 50 wherein said electro-optic polymers have different refractive indices and are mixed in such proportion as to obtain said refractive index of said electro-optic medium.

52. The method of claim 51 wherein at least one of said polymers is fluoridated.

53. The method of claim 45 comprising the further step of forming a dielectric superstrate on top of said electrodes.

* * * * *